United States Patent
Glen et al.

(10) Patent No.: US 6,462,786 B1
(45) Date of Patent: *Oct. 8, 2002

(54) METHOD AND APPARATUS FOR BLENDING IMAGE INPUT LAYERS

(75) Inventors: David I. J. Glen, Toronto (CA); Michael Frank, Newtown, PA (US); Ed Callway, Toronto (CA)

(73) Assignee: ATI International SRL, Christ Church (BB)

( * ) Notice: Subject to any disclaimer, the term of this patent is extended or adjusted under 35 U.S.C. 154(b) by 0 days.

This patent is subject to a terminal disclaimer.

(21) Appl. No.: 09/212,141

(22) Filed: Dec. 15, 1998

(51) Int. Cl.$^7$ ................................................. H04N 9/76
(52) U.S. Cl. ...................... 348/599; 348/453; 348/555; 348/557; 348/584
(58) Field of Search ................................ 348/599, 453, 348/450, 554, 555, 557, 185; 345/112, 113, 153, 154, 155, 453; 382/162, 166; 358/518, 450, 500

(56) References Cited

U.S. PATENT DOCUMENTS

| | | | |
|---|---|---|---|
| 5,065,143 A | | 11/1991 | Greaves et al. |
| 5,367,318 A | * | 11/1994 | Beaudin et al. ............. 345/185 |
| 5,521,722 A | * | 5/1996 | Colvill et al. ............... 358/500 |
| 5,598,525 A | | 1/1997 | Nally et al. |
| 5,874,967 A | * | 2/1999 | West et al. .................. 345/113 |
| 5,963,201 A | * | 10/1999 | McGreggor et al. ........ 345/326 |
| 6,028,583 A | * | 2/2000 | Hamburg ..................... 345/113 |
| 6,157,415 A | * | 12/2000 | Glen ........................... 348/599 |

* cited by examiner

*Primary Examiner*—John Miller
*Assistant Examiner*—Trang U. Tran
(74) *Attorney, Agent, or Firm*—Vedder Price Kaufman & Kammholz

(57) ABSTRACT

A method and apparatus for blending a plurality of image input layers include processing that begins by converting each of a plurality of image input layers that have a color base that differs from a color base of a display into a image layer having the color base of the display, thereby producing converting image layers. The color base of the image input layers and of the output include the colorimetries of various standardized video signals, color space, and/or any other defining display characteristics of video signals that is currently standardized or maybe standardized. Further note that an image input layer corresponds to a window, a background and/or a display area of a display, where the display is capable of presenting more than one image, where the images originate from different video and/or graphics data sources (e.g., a television signal, and a computer application display). The processing continues by blending each of the converted image layers with each of the plurality of image input layers that have the color base of the display to produce a blended output having the color base of the display.

27 Claims, 14 Drawing Sheets

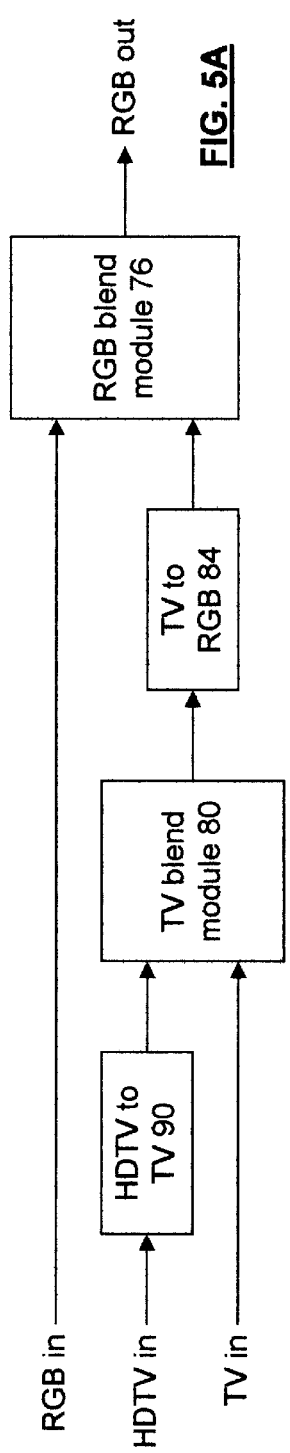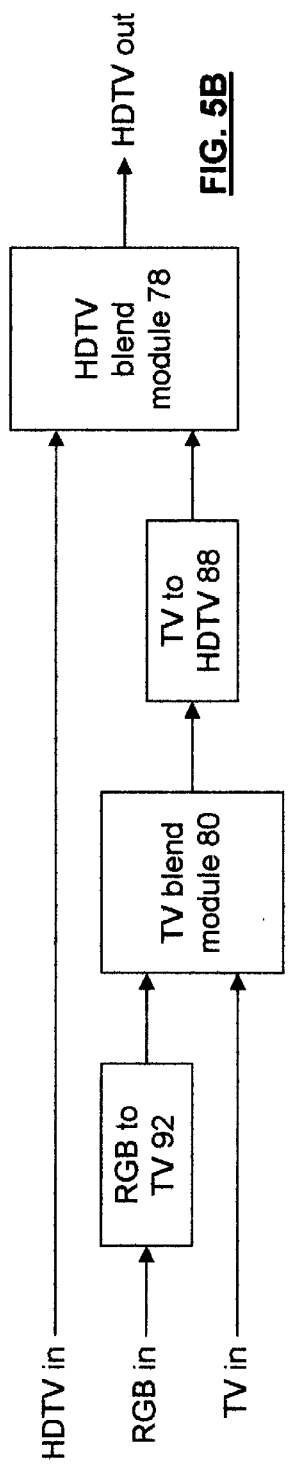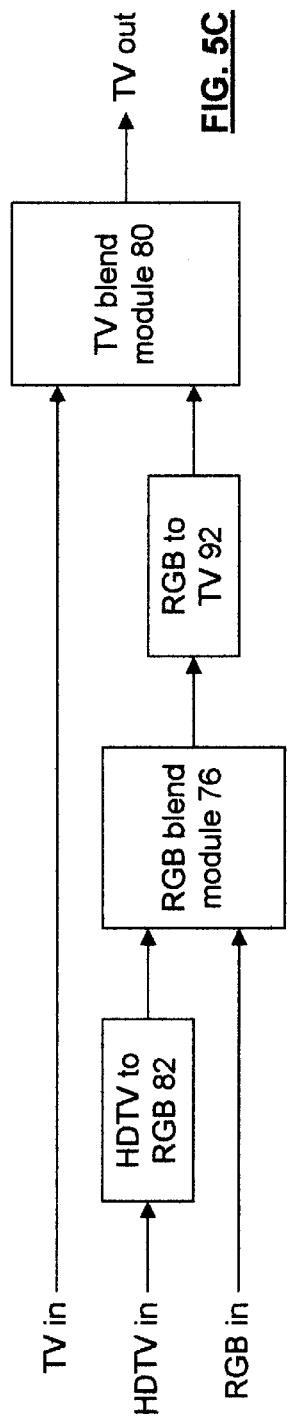

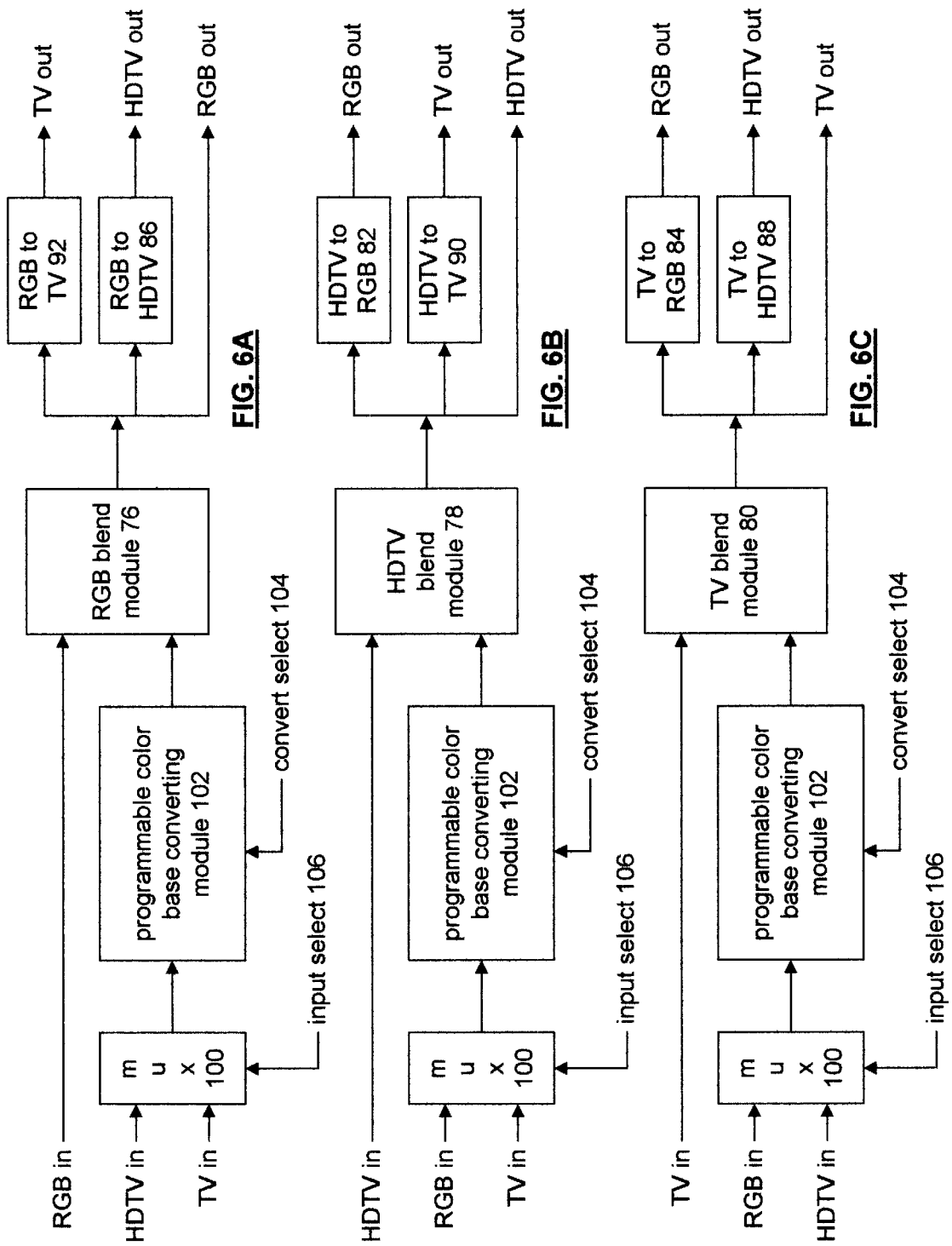

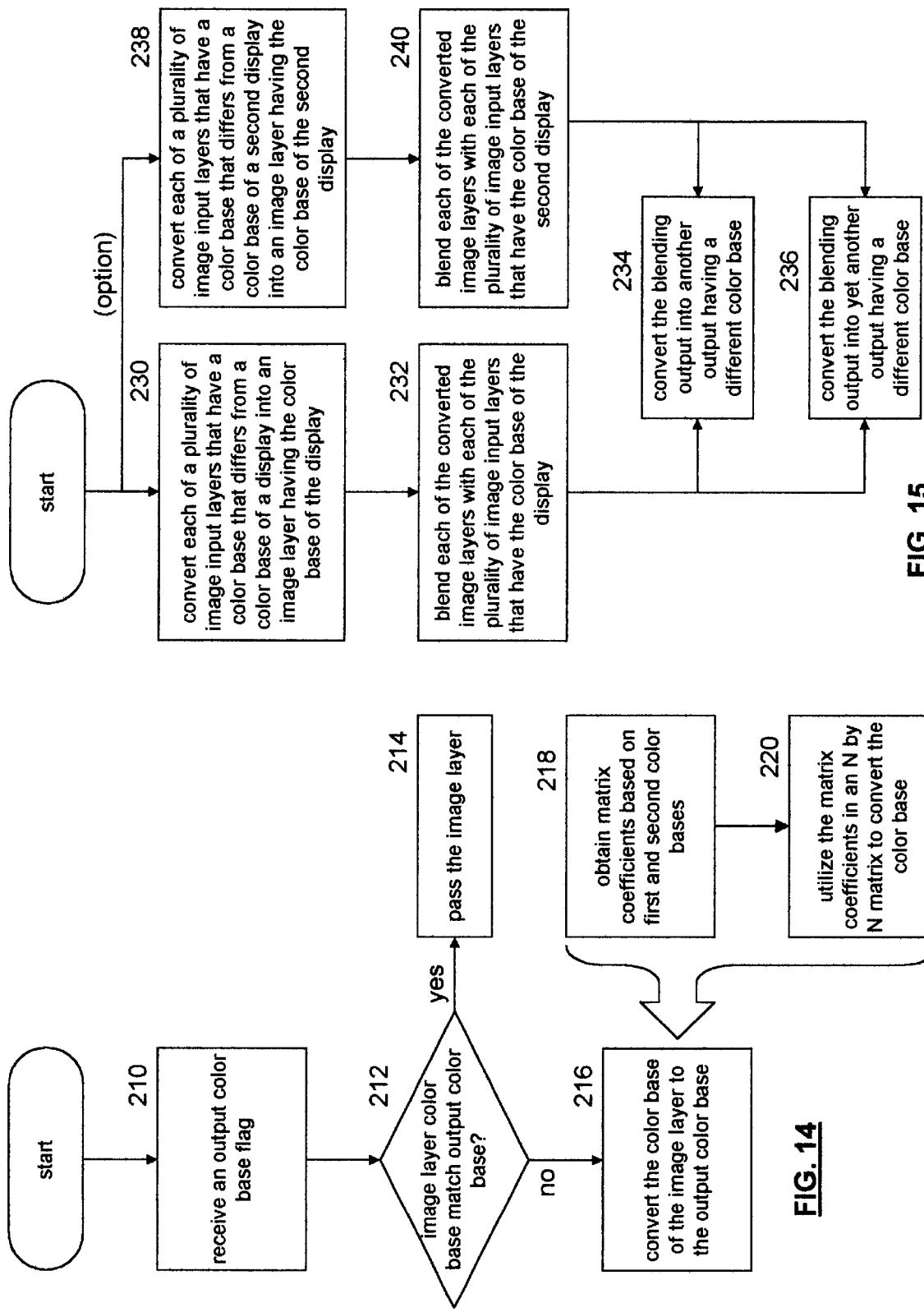

METHOD AND APPARATUS FOR BLENDING IMAGE INPUT LAYERS

TECHNICAL FIELD OF THE INVENTION

This invention relates generally to video signal processing and more particularly to blending of images having different standardized color encoding.

BACKGROUND OF THE INVENTION

As is known, video displaying and/or video recording equipment ("video equipment") receives a video signal, processes it, and displays it and/or records it. The video equipment, which may be a television, a personal computer, a work station, a video cassette recorder (VCR), a DVD player, a high definition television, a laser disc player, etc., receives the video signal from a video source. The type of video source varies depending on the type of video equipment. For example, the video source for a television may be a VCR, a DVD player, a laser disc player, an antenna operable to receive a broadcast television signal, a cable box, a satellite receiver, etc. The processing also varies depending on the type of video equipment. For example, when the video equipment is a computer, the processing may include scaling to fit the video images into a window, converting the video signal into RGB (red-green-blue) data, etc.

As is further known, encoding parameters (e.g., resolution, aspect ratio, color spaces, colorimetries) of a video signal are standardized for the various types of video sources. For example, digital television video signals are standardized by the Advanced Television Standards Committee (ATSC), while regular television signals (e.g., VCR outputs, cable box outputs, broadcast television signals, etc.) are standardized by one of the National Television Standards Committee (NTSC) or International Telecommunication Union (ITU), which prescribe Phase Alternate Line (PAL), or Sequential Couleur Avec Memoire (SECAM). Video signals displayed on a computer are standardized by de-facto standards, evolving standards (e.g., VESA, or IEC) that prescribe the encoding parameters for analog RGB signals and digital RGB signals for CRT and flat panel displays.

Additional standards have been created to regulate the conversion of regular television signals into digital RGB data. For instance, Standard ITU-R BT.601("the 601 Standard") defines a single 3 by 3 matrix and corresponding coefficients for converting NTSC, PAL, and/or SECAM video data into digital RGB data. Standards have also been created for regulating conversion of digital television signals into digital RGB signals. For instance, a relevant portion of Standard SMPTE 274M, Standard SMPTE 240, and/or ITU-R BT.709("the 709 standard") defines a matrix and coefficients for converting digital television to digital RGB data. In particular, the 709 standard defines two matrixes that are commonly used for converting MPEG (i.e., ISO/IEC 13818 specification) compliant digital television signals into digital RGB data. However, MPEG allows for six different matrixes to be used. Thus, video equipment designed to be digital television compliant would not be fully compliant with MPEG.

An issue arises due to the various standards, the various standard compliant video equipment, and the phase in of digital television—with full digital television occurring in the year 2006. During the phase in of digital television, regular TV will be used in a gradual phasing out manner. As such, some video equipment will be regular TV compliant, but not digital television compliant, newer video equipment may be digital television compliant, but not regular TV compliant, etc.

Therefore, a need exists for a method and apparatus that allow video equipment to readily convert video signals from one standarized color encoding to another.

BRIEF DESCRIPTION OF THE DRAWINGS

FIGS. 5A, 5B and 5C illustrate schematic block diagrams of alternate embodiments of the image blending module in accordance with the present invention;

FIGS. 6A, 6B and 6C illustrate schematic block diagrams of further embodiments of the image blending module in accordance with the present invention;

FIG. 14 illustrates a logic diagram of an alternate method for color base conversion in accordance with the present invention;

FIG. 15 illustrates a logic diagram of a method for image input layer blending in accordance with the present invention;

DETAILED DESCRIPTION OF A PREFERRED EMBODIMENT

Generally, the present invention provides a method and apparatus for blending a plurality of image input layers. Such a method and apparatus include processing that begins by converting each of a plurality of image input layers that have a color base that differs from a color base of a display into an image layer having the color base of the display, thereby producing converted image layers. The color base of the image input layers and of the output include the colorimetries of various standardized video signals, color space, and/or any other defining display characteristics of video signals that is currently standardized or may be standardized. Further note that an image input layer corresponds to a window, a background and/or a display area of a display, where the display is capable of presenting more than one image, where the images originate from different video and/or graphics data sources (e.g., a television signal, and a computer application display). The processing continues by blending each of the converted image layers with each of the plurality of image input layers that have the color base of the display to produce a blended output having he color base of the display. With such a method and apparatus, video equipment can readily convert video signals of various standardized colorimetries to have colorimetries that match the colorimetry capabilities of the video equipment.

Figure 1:
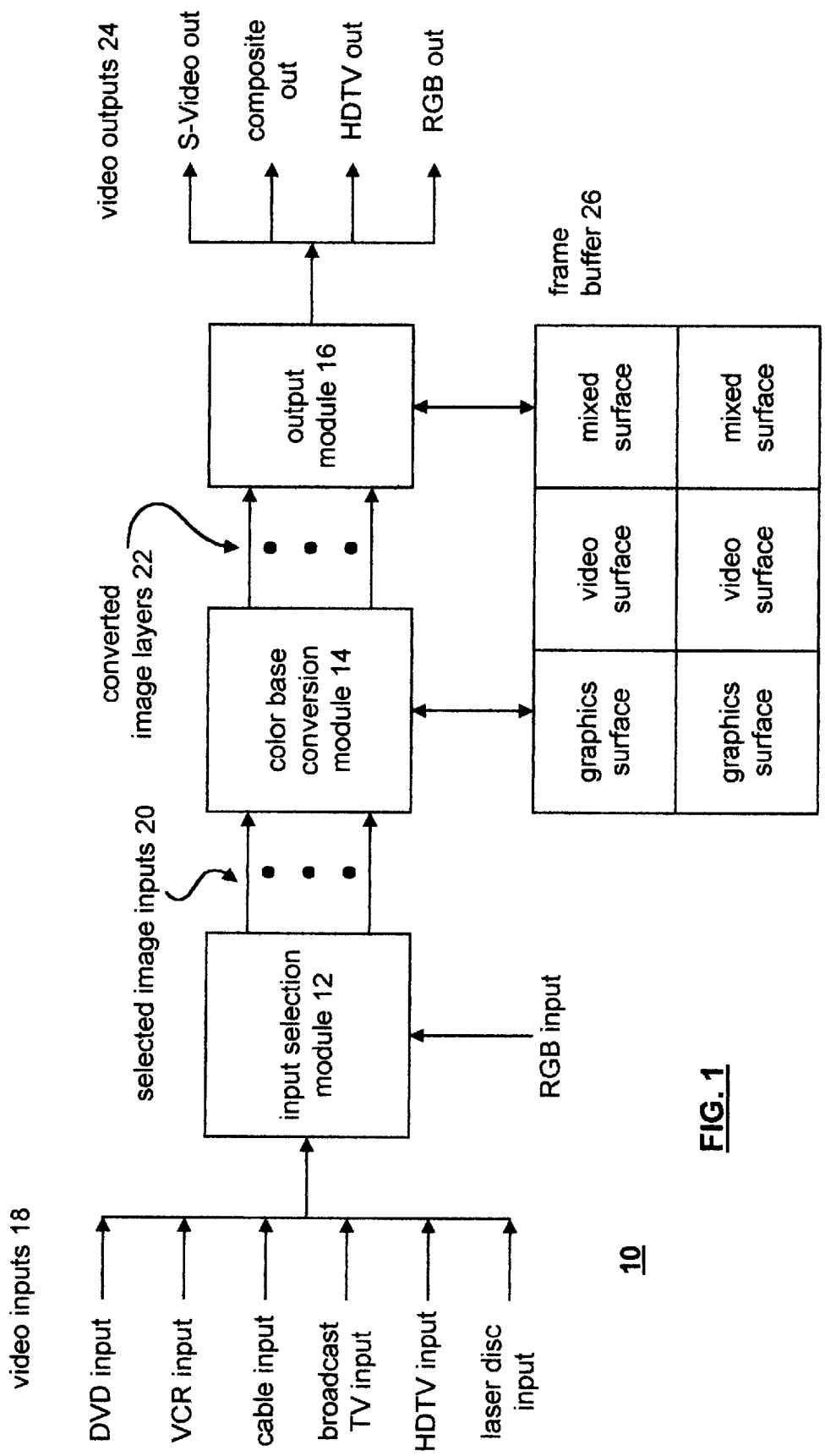
FIG. 1 illustrates a schematic block diagram of video equipment in accordance with the present invention.

The present invention can be more fully described with reference to FIGS. 1 through 17. FIG. 1 illustrates a schematic block diagram of an image layer blending module 10 that may be incorporated into video equipment. The blending module 10 includes an input selection module 12, a color base conversion module 14, an output module 16, and a frame buffer 26. The input selection module 12 is operably coupled to receive a plurality of video inputs 18 and RGB inputs. The video inputs 18 may be from a DVD player, a VCR, a cable box, an antenna operable to receive broadcast television signals, a digital television signal (e.g., HDTV, MPEG, fire wire, or DTV, hereinafter digital television or HDTV are used to refer to any one these digital television signals), and/or a laser disk player. The RGB inputs may be from a central processing unit that generates graphics data (e.g., data corresponding to an application being executed by a computer) and/or a hardware cursor.

The input selection module 12 may include a single port for receiving a video input 18. As such the selection process is done manually by a user that selects one of the plurality of video inputs and manually couples the selected video input to the video input port. The input selection module 12 is operably coupled to a central processing unit, or other processing entity that is capable of producing graphics data, for receiving the RGB input data. As such, the image blending module 10 may be incorporated into a personal computer that includes a television tuner board and video graphics processing circuitry. The All-in-Wonder product line manufactured and distributed by ATI International provides such functionality and may further be modified to include the teachings of the present invention.

Alternatively, the input selection module 12 may include a plurality of ports for receiving the video inputs 18 and include a selection switch for selecting one or more of the video inputs. In addition, the input selection module 12, based on user inputs received via graphical user inputs, keyboards, remote control devices, channel changers, etc., selects which of the video inputs and RGB inputs will be displayed and in which portions of the display area. For example, the user may select to have a video input displayed in the background while an RGB input is displayed in a window having a foreground position with respect to the background. Conversely, the user may select to have the video input displayed in a particular window and the RGB input data being displayed in the background.

The selected image inputs 20 are provided to the color base conversion module 14 which produces therefrom converted image layers 22, when necessary. In general, the color base conversion module 14 will convert the color base of each of the selected image inputs 20 when the color base of the image inputs 20 does not match the color base of the output, or an intermediate color base. As such, if the video equipment is capable of only displaying one type of video having a particular color base, the color base conversion module 14 will convert the color base of the image input layers to have the color base of the output, or the intermediate color base. The conversion of the color bases of image inputs will be discussed in greater detail with respect to the remaining figures. The color base conversion module 14 passes the selected image inputs 20 that have a color base that matches the color base of the output, i.e., does not perform a color base conversion.

The converted and non-converted image inputs 20 are stored within the frame buffer 26 by the color base conversion module 14. As shown, the frame buffer 26 includes a plurality of surfaces, a pair of surfaces are dedicated to graphics data, a second pair to video data, and a third pair to mixed video and/or graphics data. Each of the pairs of surfaces may be used in a double buffered manner such that one of the pairs is functioning as a back buffer while the other surface of the pair functions as a front buffer. As one of average skill in the art would appreciate, the frame buffer 26 may include only graphic data surfaces and/or video surfaces and/or mixed data surfaces. One of average skill in the art would further appreciate that the frame buffer may include only a single surface which corresponds to the display and the data and/or mixed data may bypass the frame buffer entirely.

The output module 16 retrieves the graphics data and/or video data from the frame buffer and produces the corresponding video output 24. The output module 16 performs a blending function of the retrieved data, which may be graphics data and/or video data. In general, the blending of retrieved data causes graphics data to be displayed in a corresponding portion(s) of a display(s) and the video data to be displayed in a corresponding portion(s) of a display(s). For example, the video data may be presented in a first window while the graphics data is presented in a second window. The output module 16 may then output the blended data to one of the output ports, or store it in the mixed data surface and subsequently provided it to an output port. In the first approach, an output module 16 performs two or more read functions (e.g., obtain the data from the frame buffer) and a blend function. In the later approach, the output module 16 performs two or more read functions, a blend function, a write function (e.g., to write the blended data into the mixed surface) and another read function (e.g., to obtained the blended data from the mixed surface). As such, the later approach may require additional memory and video graphics processing bandwidth due to the extra read and write functions.

The output module 16 may output the data as an S-video signal, a composite video signal, a digital television signal, a digital RGB signal, and/or an analog RGB signal. As one of average skill in the art would appreciate, the regular television video outputs (e.g., S-video output and the composite video output) support signals that are in accordance with the 601 Standard and may further be compliant with the NTSC, PAL, or SECAM. The digital television output supports digital television signals that are in accordance with the 709 Standard. As one of average skill in the art will further appreciate, the regular TV inputs and the digital television inputs support signals that are in accordance with the 601 Standard and the 709 Standard, respectively. Accordingly, the image blending module 10 is capable of receiving video signals and/or graphics data in various standardized forms and producing video outputs 24 in various standardized output forms based on the color base capabilities of the video equipment incorporating an image layer blending module 10.

Figure 2:
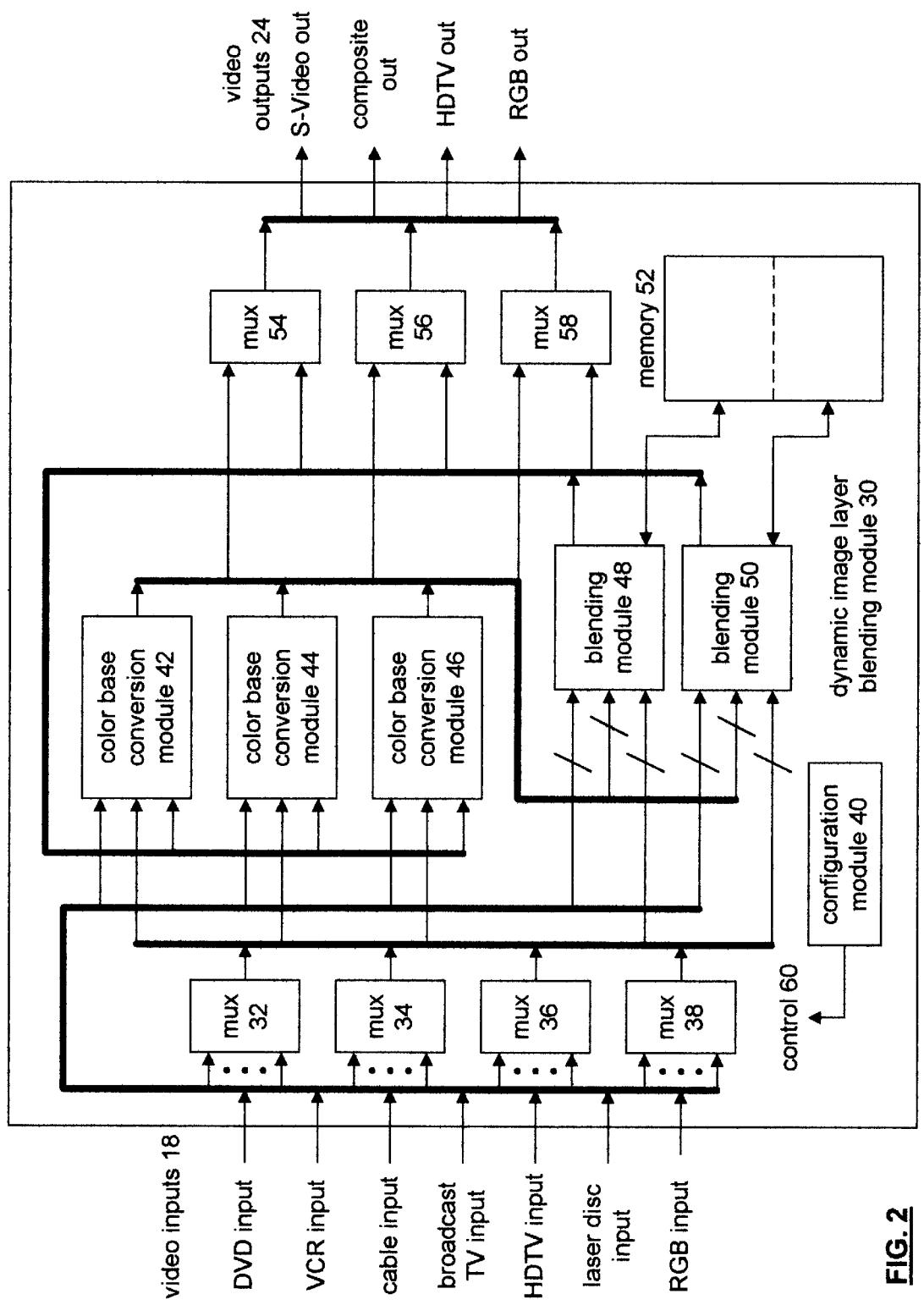
FIG. 2 illustrates a schematic block diagram of a dynamic image layer blending module in accordance with the present invention.

FIG. 2 illustrates a schematic block diagram of a dynamic image layer blending module 30. The dynamic image layer blending module 30 includes a plurality of input multiplexors 32–38, a plurality of color base conversion modules 42–46, a plurality of blending modules 48 and 50, a configuration module 40, a plurality of output multiplexors 54–58 and memory 52. The configuration module 40 generates control signals based on the color bases of selected ones of the video inputs 18, and the color base(s) of the desired video outputs. To perform this function, the configuration module 40 performs the processing steps as illustrated and discussed with reference to FIG. 17. In general, the configuration module 40 causes one or more of the selected video inputs to be provided to a color base conversion module 42–46, such that the color base of the selected video input is converted to match the color base of one of the outputs.

Alternatively, the configuration module 40 may cause one or more of the video inputs 18 to be provided directly to a blending module 48 and 50. The output of such a blending module 48 or 50 may then be provided directly to one of the output multiplexors 54–58, to a color base conversion module 42–46, or feedback to the blending module 48 or 52. Note that the blending modules 48 and 50 utilize memory 52 for storing graphics data and/or video data similarly to the manner in which the output module 16 used the frame buffer 26 (See FIG. 1). As such, the configuration module 40 can dynamically configure the dynamic image layer blending module 30 in a multitude of configurations, based on the color base(s) of the input signal(s) and the color base(s) of the output(s). FIGS. 3 through 9 illustrate a few of the embodiments that the dynamic image layer blending module 30 may be programmed to implement. Alternatively, the embodiments of FIGS. 3 through 9 may be stand alone configurations for specific implementations. As one of average skill in the art would appreciate, the dynamic image layer blending module 30 of FIG. 2 allows for the blending module 30 to be incorporated into a variety of video equipment and be dynamically configured to provide the desired color base conversions and blending. Alternatively, the specific embodiments shown in FIGS. 3 through 9 may be dedicated to a particular type of video equipment having a given set of display inputs and outputs.

Figure 3:
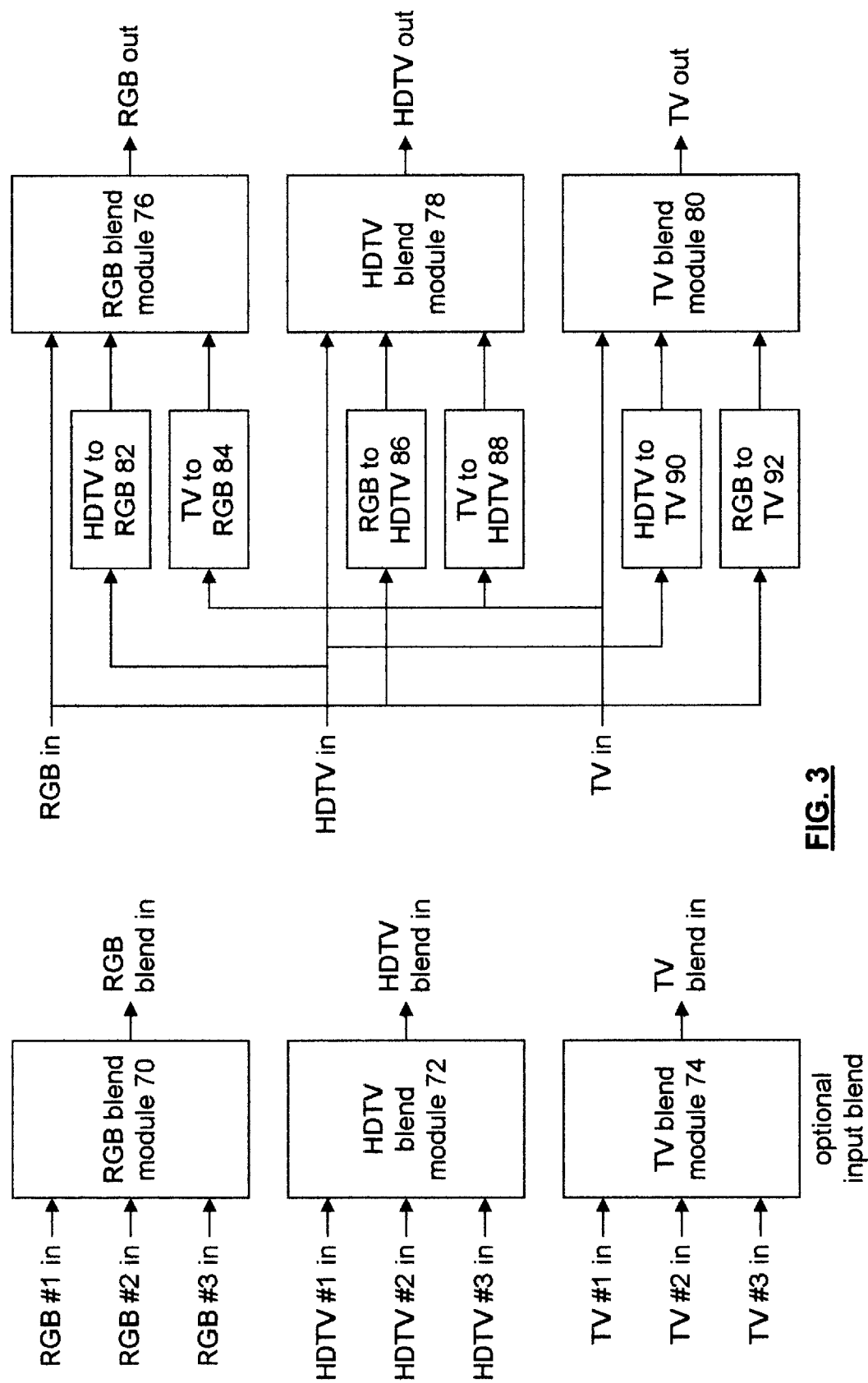
FIG. 3 illustrates a schematic block diagram of an image blending module in accordance with the present invention.

FIG. 3 illustrates a schematic block diagram of a blending module that includes an RGB blending module 76, an digital television blending module 78, and a TV blending module 80. The RGB blending module 76 generates an RGB output, which is typically in a digital format. An analog RGB signal may be readily obtained by passing the digital RGB signal through a digital-to-analog converter. The RGB blending module 76 is operably coupled to receive an RGB input(s), the output(s) of an digital television to RGB color base converter(s) 82, and the output(s) of a TV to RGB color base converter(s) 84. As such, converters 82 and 84 are performing a matrix function, wherein the coefficients of the matrix are defined within the corresponding specification, to produce an RGB equivalent output. As such, the RGB blending module 76 is blending RGB signals.

The digital television blending module 78 is operably coupled to receive a digital television input(s), the output(s) of an RGB to digital television color base conversion module(s) 86, and the output(s) of a TV to digital television color base conversion module(s) 88. The TV blending module 80 is operably coupled to receive a TV input signal(s) (e.g., any one of the regular television signals, such as from a VCR, cable box, etc.) and the output(s) of an digital television to TV color base conversion module(s) 90 and the output(s) of an RGB to TV color base conversion module(s) 92. As such, the image blending module of FIG. 3 may be utilized in a system that allows for digital and/or analog RGB outputs, has an digital television output port(s) and/or a standard TV output port(s). As such video equipment that incorporates the blending module of FIG. 3 may be able to receive graphics data, digital television signals and/or TV signals, blend these input signals and produce a video output in an RGB color base, in an digital television color base, and/or in a standardized TV color base.

FIG. 3 further illustrates that the RGB input may be generated from the blending of a plurality of RGB inputs via an RGB blending module 70. Similarly, the digital television input may be a blended input which is produced by the digital television blending module 72 that blends a plurality of digital television inputs. Likewise, the TV input may be a blended TV input produced by the TV blending module 74 that blends a plurality of television input signals. Note that the blending involves generating pixel data that places the corresponding video signals and/or graphic data signals in particular portions of a display (i.e., windows, background, etc.). In addition, the blending may include alpha blending such that the foreground image has a transparency allowing a background image to be seen. Further, the blending may include a morph blending such that the two images are morphed together and may further include spatial and temporal blending. (e.g., de-interlacing, frame rate correction, three-dimensional transformations that are affine transformations, perspective correction transformations, and/or isotropic transformations). As one of average skill in the art would readily appreciate, once the data is in a format of like color bases, any type of video graphics manipulation may be performed on the various video and/or graphic data signals. Note that the multiple pipeline implementation of FIG. 3 provides an additional advantage in that color base conversions done in YUV color space preserves data accuracy in comparison to a color base conversion from YUV color space to RGB color space and back to YUV color space.

Figure 4A:
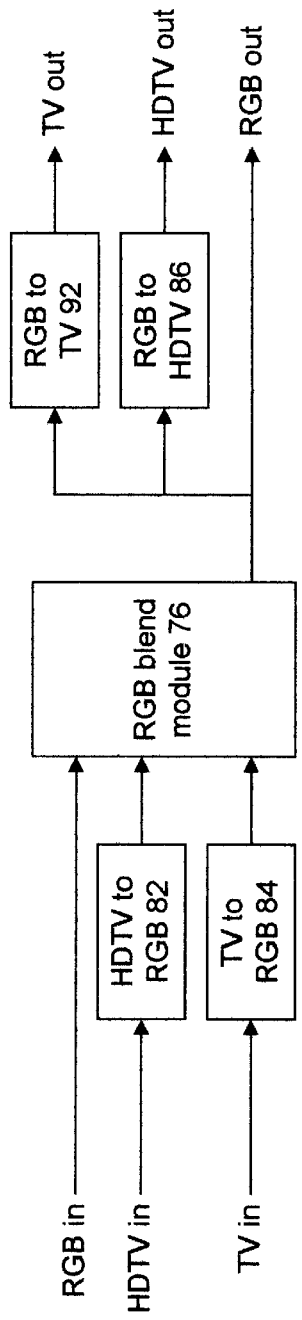
FIGS. 4A, 4B and 4C illustrate embodiments of the image blending module in accordance with the present invention.

FIG. 4A illustrates a schematic block diagram of an alternate embodiment for the image blending module. In this embodiment, each of the input signals are provided in, and/or converted into, an RGB color base format prior to blending. Thus, graphics data inputs, which are in the RGB color base format, are provided directly to the RGB blending module 76. The digital television signals are provided to the digital television to RGB blending color base conversion module 82 that provides a color base converted signal to the RGB blending module 76. Similarly, the TV input signals are provided to the TV to RGB color base conversion module 84 that provides a color base converted signal to the RGB blending module 76.

The RGB blending module 76 outputs an RGB blended signal. The RGB blended signal may then be converted to an digital television output signal via an RGB to digital television color base conversion module 86. Further, the RGB output may be converted to a television output signal via the RGB to television color base conversion module 92.

Figure 4B:
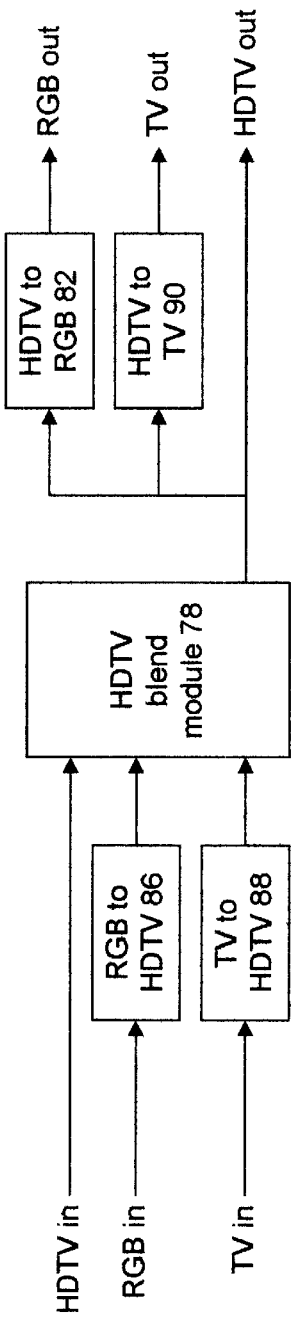

FIG. 4B illustrates an embodiment of the blending module wherein the input signals are provided in, and/or converted into, an digital television color base prior to blending. In this embodiment, the digital television blending module 78 is operably coupled to directly received digital television inputs, and, the output of the RGB to digital television color base conversion module 86 and the TV to digital television color base conversion module 88.

The digital television blending module 78 blends the inputs to provide a blended output signal having a color base corresponding to digital television requirements. The digital television signal may subsequently be converted to a television output signal via the digital television to TV color base conversion module 90. In addition, the digital television output signal may subsequently be converted to an RGB output signal via the digital television to RGB color base conversion module 82.

Figure 4C:
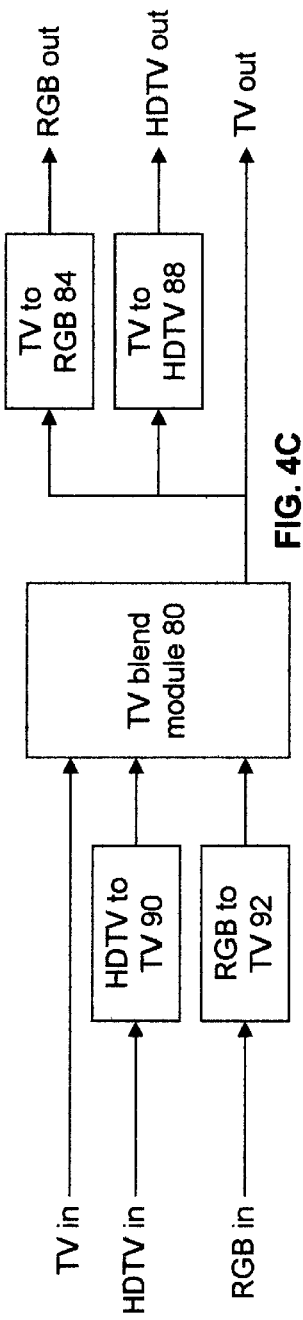

FIG. 4C illustrates a blending module wherein the signals are converted to a color base corresponding to the television signals prior to blending. In this embodiment, the television blending module 80 is operably coupled to directly receive television input signals, the output of the digital television to TV color base conversion module 90, and the output of the RGB to TV color base conversion module 92. The television blending module 80 outputs a television signal, which may subsequently be converted to an digital television output signal via the TV to digital television color base conversion module 88. In addition, the television output signal may subsequently be converted to an RGB output signal via the TV to the RGB color base conversion module 84.

FIG. 5A illustrates a schematic block diagram of an embodiment of an image blending module. In this embodiment, an RBG blending module 76 is incorporated to blend RGB signals to produce an RGB output. As such, the RGB inputs are provided directly to the RGB blending module 76. The digital television input signals may be converted to have a color base corresponding to the television signal (i.e., an intermediate color base) via the digital television to TV color base conversion module 90. A TV blending module 80 blends the TV input signals and the color base converted digital television signal to produce a single blended television output signal. The blended television output signal is converted to an RGB color base signal via the TV to RGB color base converting module 84. The color base converted signal is then provided to the RGB blending module which is subsequently blended with the RGB input.

FIG. 5B illustrates a schematic block diagram of an alternate embodiment of an image blending module. In this embodiment, an digital television blending module 78 is operably coupled to directly receive digital television input signals and digital television color base converted signals. Accordingly, RGB signals are converted to signals having the color base of television signals (i.e., and intermediate color base) via the RGB to TV color base conversion module 92. The television blending module 80 is operable to blend the converted RGB signals and TV input signals to produce a blended TV signal. The blended TV signal is converted to a signal having an digital television color base via the TV to digital television color base conversion module 88.

FIG. 5C illustrates a schematic block diagram of an embodiment of an image layer blending module. In this embodiment, a TV blending module 80 is operably coupled to directly received television input signals and blended converted television signals. As shown, digital television input signals are converted to have an RGB color base via the digital television to RGB color base conversion module 82. The RGB blending module 76 is operably coupled to blend the input signals to produce a blended signal having the RGB color base. The blended signals are then converted to a color base corresponding to television signals via the RGB to TV color base conversion module 92.

FIGS. 6A through 6C illustrate various embodiments of an image blending module. Each of the image blending module embodiments includes a programmable color base converting module 102, a multiplexor 100 and one of an RGB blending module 76, an HDTV blending module 78, or a TV blending module 80. In each of these embodiments, the multiplexor 100, via an input select signal 106, selects one of the input signals. The selected input signal is passed to the programmable color base converting module 102. Based on the convert select signal 104, the selected input signal is converted to the color base corresponding to the blending module 76, 78, or 80.

As such, as shown in FIG. 6A, the RGB input signal may be blended with an digital television input signal and/or with a TV input signal. When the digital television input signal is selected, the programmable color base converting module 102 is programmed to convert the color base of an digital television signal into a color base of an RGB signal. The programmable color base converting modules 102 of FIGS. 6B and 6C perform similar functions. As further shown in 6A through 6C, the corresponding color base output may be converted via the color base conversion modules 92, 86, 82, 90, 84 88 to one or more of the other color base output signals. Note that the programmable color base converting modules 102 will be discussed in greater detail with reference to FIGS. 12–14.

Figure 7:
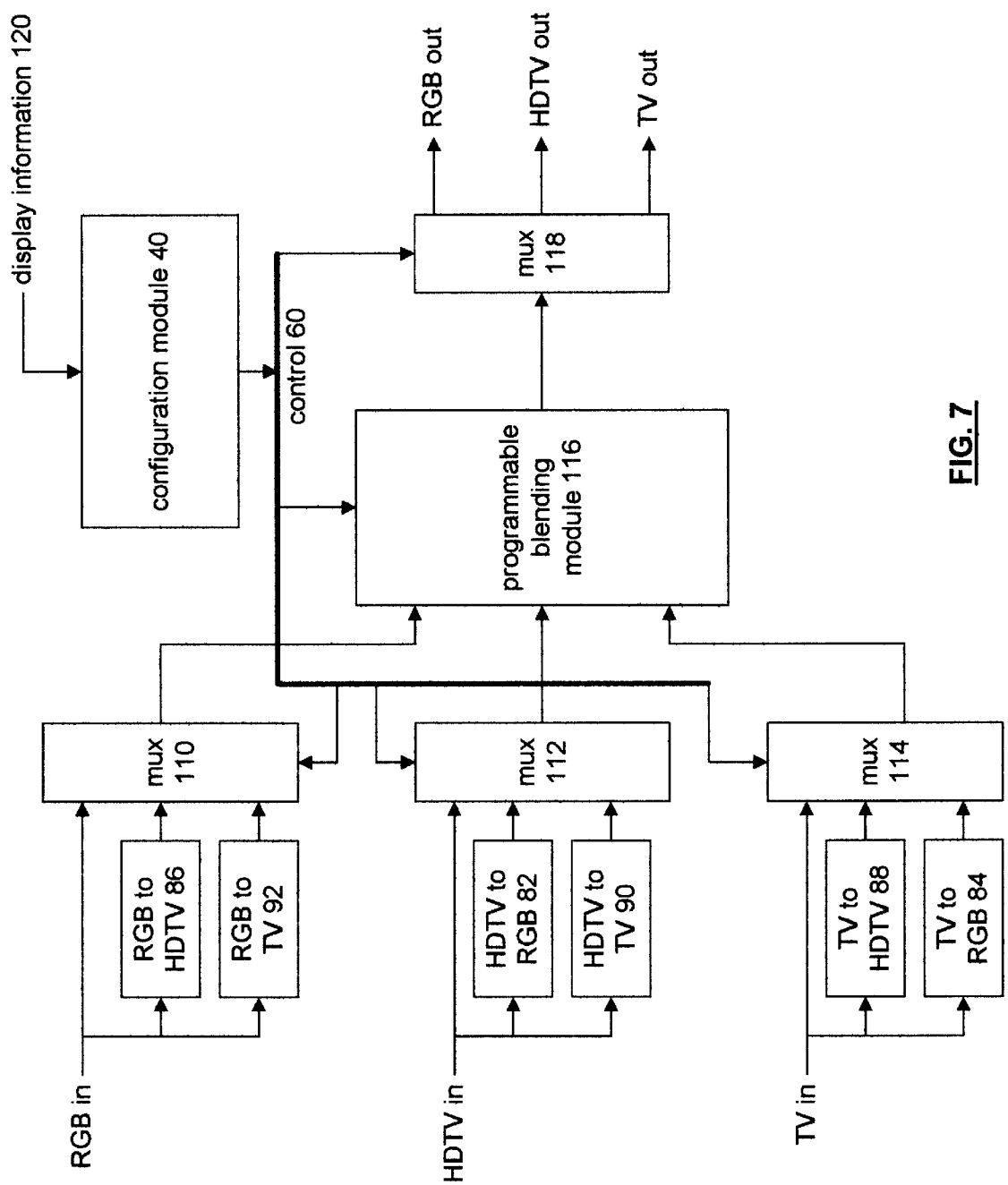
FIG. 7 illustrates a schematic block diagram of a still further embodiment of the image blending module in accordance with the present invention.

FIG. 7 illustrates another embodiment of the image input layer blending module that includes a programmable blending module 116. Based on control information 60 from the configuration module 40, the programmable blending module 116 may be programmed to blend RGB signals, digital television signals, and/or TV signals. The configuration module 40 determines which type of blending is to be performed based on display information 120. For example, if the display information 120 indicates that the video equipment is capable of only RGB outputs and/or standardized television outputs, the configuration module 40 will cause the blending module to perform either RGB blending or TV blending. Typically, one type of video signal will be the primary display option, thereby indicating the preferred choice of color base blending.

As an illustrated example of the blending module of FIG. 7, assume that the configuration module 40 has selected that the programmable blending module 116 should perform digital television blending. Recall that the blending essentially refers to the data being presented in designated areas of a display. As is known, the resolution for digital television is different from the resolution of RGB and/or television signals. Thus, the blending performed by module 116 will vary in accordance with the resolutions of the desired output signals. For example, if an RGB is the selected output, the resolution may be 640×480, whereas if digital television is the selected output, the resolution may be 1920×1080 or 1280×720.

Continuing with the example, the programmable blending module 116 is programmed to blend signals having a digital television color base. The control information 60 causes multiplexor 118 to output the digital television output and further causes multiplexor 110 to output the RGB to digital television color base converted signal. In addition, the control information 60 causes multiplexor 112 to output the digital television input and multiplexor 114 to output the TV to digital television color base converted signal. As such, the blending module 116 is receiving signals having a color base corresponding to HDTV. As one of average skill in the art would appreciate, the dynamic image layer blending module of FIG. 7 may be configured in a variety of ways utilizing the configuration module and corresponding multiplexors.

Figure 8:
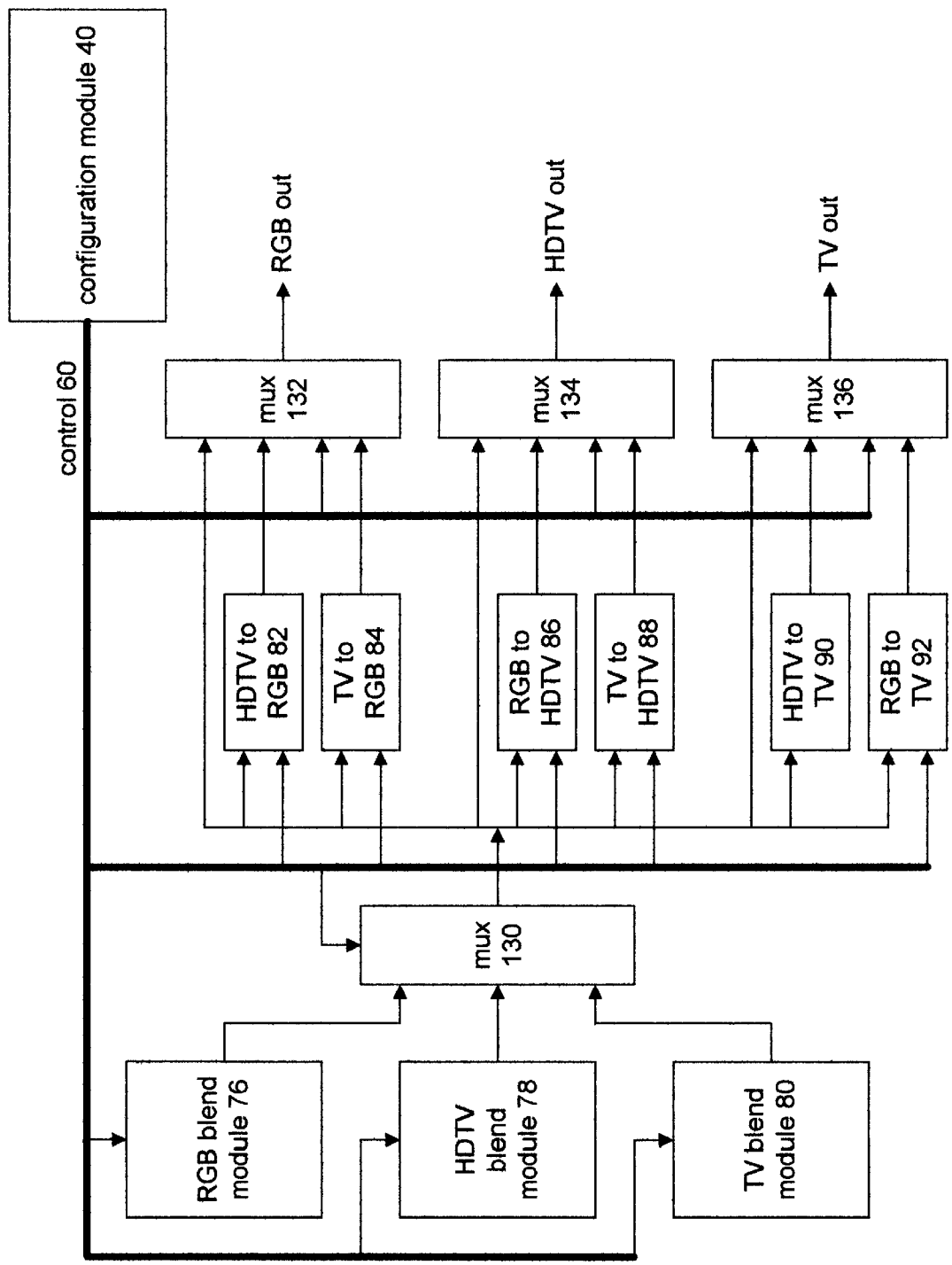
FIG. 8 illustrates a schematic block diagram of yet a further embodiment of the image blending module in accordance with the present invention.

FIG. 8 illustrates another embodiment of the image input layer blending module. In this embodiment, the RGB blending module 76, the digital television blending module 78 and the TV blending module 80 are each producing an output that is received by multiplexor 130. The signals being blended by the corresponding blending module 76, 78 and 80 may be generated in accordance with any of the preceding embodiments.

The configuration module 40, based on display information, generates the control signals 60 causing multiplexor 130 to output one of the outputs of the blending module 76, 78, or 80. Depending on which of the blending module outputs have been selected, the control signal 60 providing signaling to select one of the inputs of multiplexors 132–136 to produce the corresponding color base video output signals. As such, the embodiment of FIG. 8 may be dynamically configured based on the type of video equipment that it is incorporated in.

Figure 9:
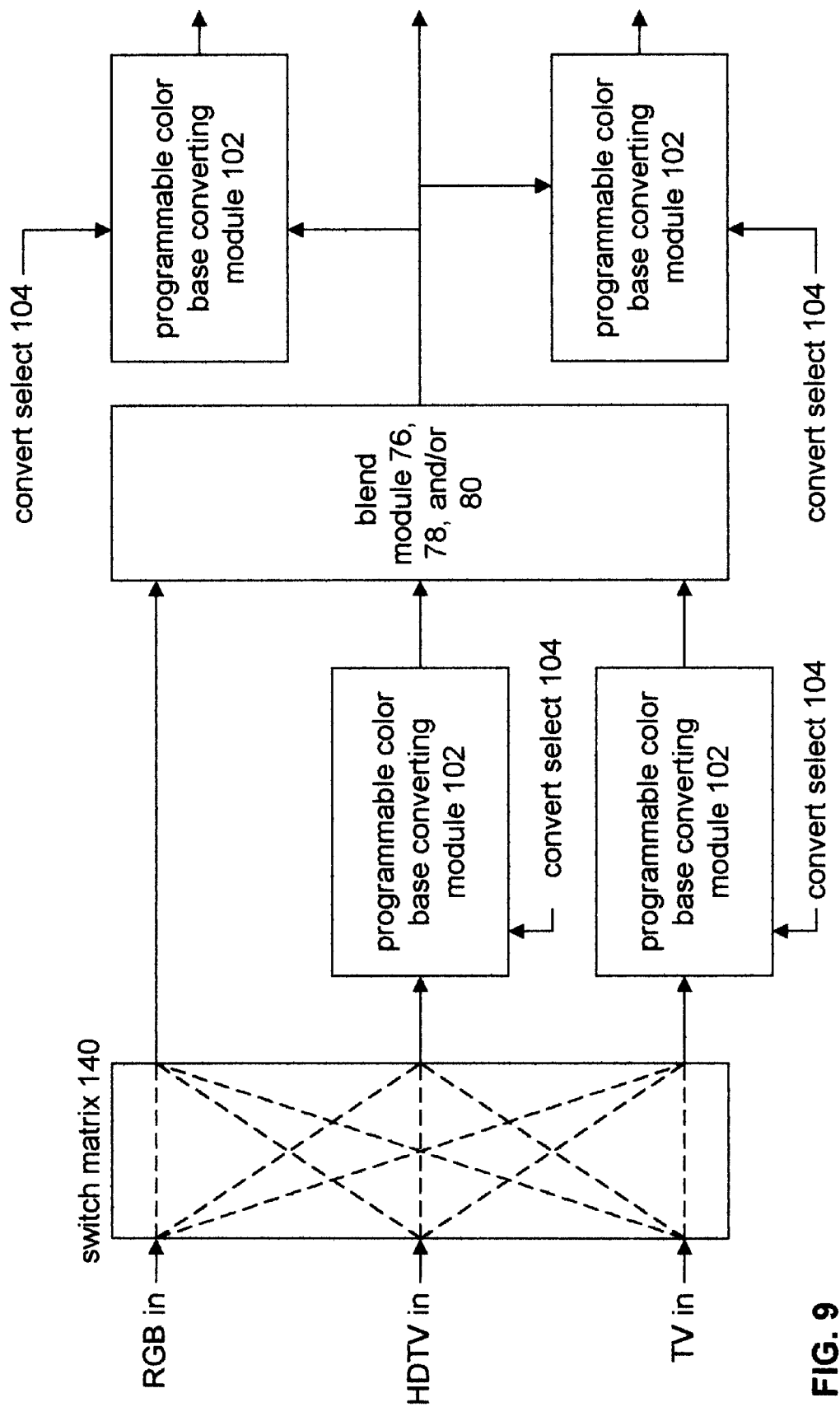
FIG. 9 illustrates a schematic block diagram of yet another embodiment of the image blending module in accordance with the present invention.

FIG. 9 illustrates a schematic block diagram of yet another embodiment of the image input layer blending module. In this embodiment, the video inputs are received via a switching matrix 140. The output of the switching matrix 140 is provided to the blending module 76, 78 and/or 80, and to programmable color base converting modules 102. The output of the blending module 76, 78 and/or 80 produces a corresponding color base output which may also be provided to programmable color base converting modules 102. In this embodiment, the switching matrix 140 and the programmable color base converting modules 102 are programmed to provide the output signals having the desired color base based on the input signals of another corresponding color base.

Figure 10:
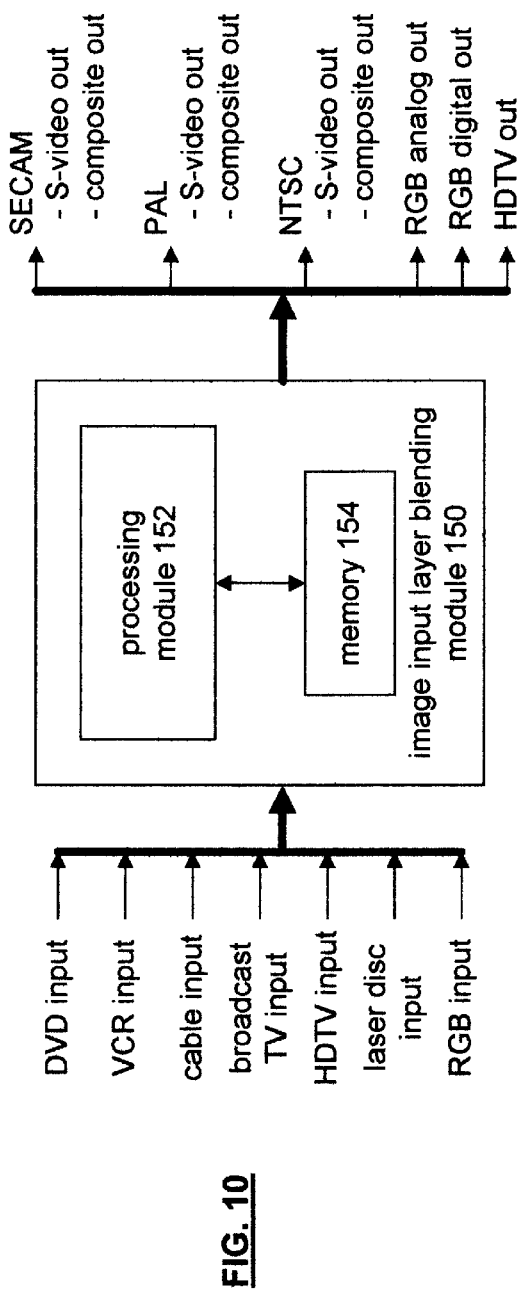
FIG. 10 illustrates a schematic block diagram of an image input layer blending module in accordance with the present invention.

FIG. 10 illustrates a schematic block diagram of an image input layer blending module 150 that includes a processing module 152 and memory 154. The image input layer blending module 150 is operably coupled to receive one or more inputs, such as a DVD input, a VCR input, a cable input, broadcast television input, HDTV input, laser disk input, and/or RGB input. Upon receiving and processing one or more of these inputs, the image input layer blending module 150 outputs one or more video outputs such as SECAM S-video signals, SECAM composite video signals, SECAM component video signals, PAL S-video signals, PAL composite video signals, PAL component video signals, NTSC S-video signals, NTSC composite video signals, NTSC component video signals, component RGB analog signals, RGB digital signals, and/or HDTV signals.

The processing module 152 may be a single processing entity or a plurality of processing entities. Such a processing entity may be a microprocessor, microcomputer, microcontroller, digital signal processor, central processing unit, state machine, logic circuitry, and/or any device that manipulates signals based on operational instructions. The memory 154 may be a single memory device or a plurality of memory devices. Such a memory device may be a read-only memory device, random access memory device, floppy disk memory, system memory, hard drive memory, magnetic tape memory, DVD memory, CD memory, and/or any device that stores digital information. Note that when the processing module 152 performs one or more of its functions via a state machine or logic circuitry, the memory containing the corresponding operational instructions is embedded within the circuitry comprising the state machine and/or logic circuitry. The operational instructions stored in memory 154 and executed by processing module 152 will be discussed in greater detail with reference to FIGS. 15 and 16.

Figure 11:
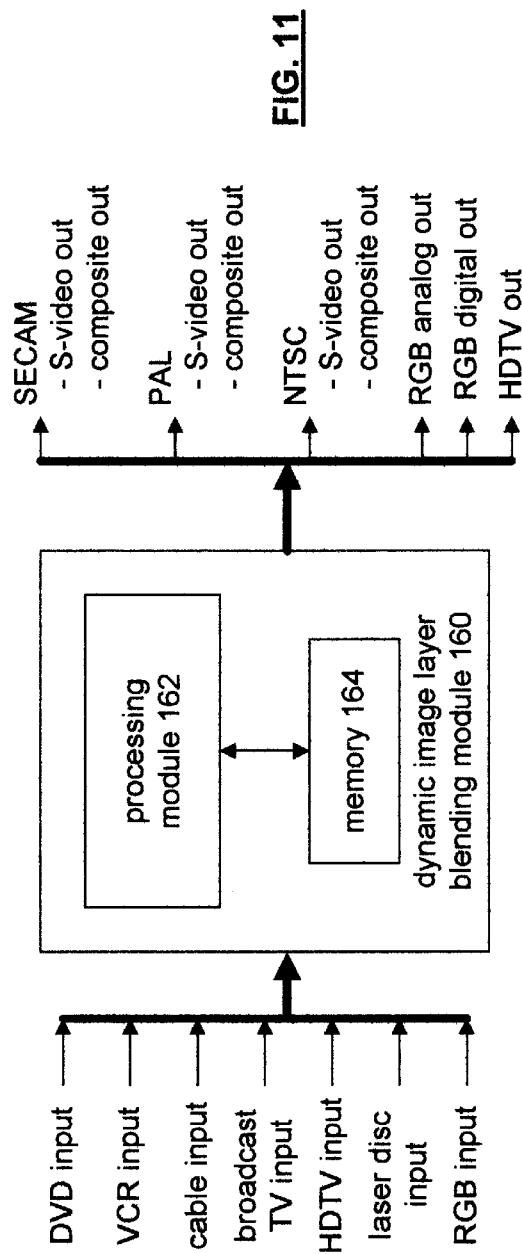
FIG. 11 illustrates a schematic block diagram of another embodiment of a dynamic image input blending module in accordance with the present invention.

FIG. 11 illustrates a schematic block diagram of a dynamic image layer blending module 160 that includes a processing module 162 and memory 164. The processing module 162 may be a single processing entity or a plurality of processing entities. Such a processing entity may be a microprocessor, microcomputer, microcontroller, digital signal processor, central processing unit, state machine, logic circuitry, and/or any device that manipulates signals based on operational instructions. The memory 164 may be a single memory device or a plurality of memory devices. Such a memory device may be a read-only memory device, random access memory device, floppy disk memory, system memory, hard drive memory, magnetic tape memory, DVD memory, CD memory, and/or any device that stores digital information. Note that when the processing module 162 performs one or more of its functions via a state machine or logic circuitry, the memory containing the corresponding operational instructions is embedded within the circuitry comprising the state machine and/or logic circuitry. The operational instructions stored in memory 164 and executed by processing module 162 will be discussed in greater detail with reference to FIG. 17.

Figures 12, 13:
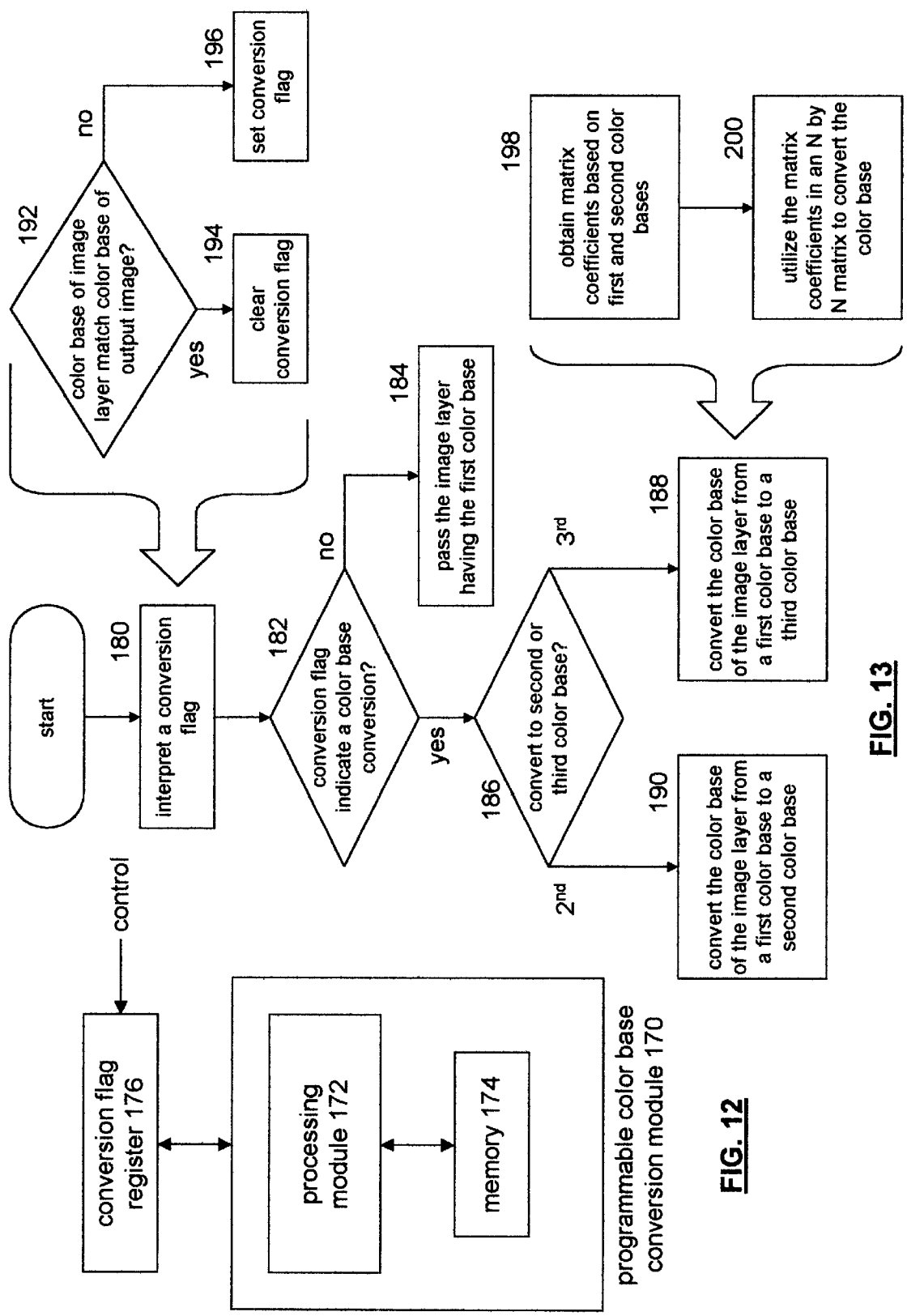
FIG. 12 illustrates a schematic block diagram of a programmable color based conversion module in accordance with the present invention.
FIG. 13 illustrates a logic diagram of a method for color base conversion in accordance with the present invention.

FIG. 12 illustrates a schematic block diagram of a programmable color base conversion module 170 that includes a processing module 172 and memory 174. The programmable color base conversion module 170 is operably coupled to a conversion flag register 176 that stores an indication of whether a conversion is to be performed and may further store an indication as to which type of conversion is to be performed. The processing module 172 may be a single processing entity or a plurality of processing entities. Such a processing entity may be a microprocessor, microcomputer, digital signal processor, central processing unit, state machine, logic circuitry, and/or any other device that manipulates digital information based on operational instructions. The memory 174 may be a single memory device or a plurality of memory devices. Such a memory device may be a read-only memory, random access memory, floppy disk memory, hard drive memory, system memory, magnetic tape memory, DVD memory, CD memory, and/or any device that stores digital information. Note that when the processing module 172 implements one or more of its functions via a state machine and/or logic circuitry, the memory storing the corresponding instructions is embedded within the circuitry comprising the state machine and/or logic circuitry. Note that the operational instructions stored in memory 174 and executed by processing module 172 will be discussed in greater detail with reference to FIGS. 13 and 14.

FIG. 13 illustrates a logic diagram of a method for converting a color base of an image layer. The processing begins at step 180 where a conversion flag is interpreted. Such an interpretation is further illustrated with reference to steps 92 through 196. At step 192, a determination is made as to whether the color base of the image layer matches the color base of an output image. If not, the conversion flag is set at 196. In addition, the conversion flag may be set to indicate the particular type of conversion to be performed. For example, the flag may indicate that digital television signal needs to be converted to a color base corresponding to an RGB signal. If the determination at step 192 indicates that the color bases match, the process proceeds to step 194 where the conversion flag is cleared.

Returning to the main flow, the process proceeds to step 182 where a determination is made as to whether the conversion flag indicates a color base conversion. If not, the process proceeds to step 184 where the color base conversion module passes the image layer having the first color base, i.e., the color base of the input signal already corresponds to the output color base.

If, however, a conversion flag indicates a color base conversion, the process proceeds to step 186 where a determination is made as to whether the first color base is to be converted to a second or third color base. If converting to the second color base, the process proceeds to step 190 where the color base of the image layer is converted from a first color base to a second color base. Note that the first and second color bases are ones of a plurality of color bases, wherein the plurality of color bases include various standardized luma and chroma requirements including ATSC, NTSC, PAL, SECAM, and RGB. Further note that the image layers comprise one of a first graphics data, second graphics data, hardware cursor, NTSC video data, ATSC video data, PAL video data, digital television video data and/or SECAM video data.

If the conversion is to convert the color base to the third color base, the process proceeds to step 188. At step 188, the color base of the image layer is converted from the first color base to the third color base. The converting of the first color base to the second or third color base may be further described with reference to steps 198 and 200. At step 198, matrix coefficients are obtained based on the first and second color bases. The matrix coefficients may be retrieved from memory, determined from generic coefficients and/or by selecting configuration of an N by N matrix. Note that the coefficients are prescribed by the corresponding standards and typically correspond to a 3×3 matrix. For example, to convert YCrCb data into RGB data, a 3×3 matrix of XYZ, ABC, WUV is utilized. The coefficients corresponding to XYZ, ABC and WUV are defined either regular television specifications (e.g, NTSC signal, PAL signal, SECAM signal, the 601 Standard) or by the digital television and the MPEG standards (e.g., the 709 Standard). To convert YCbCr data to YPbPr data, which are of the same color space, a 3×3 matrix is utilized wherein the coefficients are XOO, OBO, OOV. In addition, the converted YCbCr data is offset by coefficients D, E & F. The process then proceeds to step 200 where the matrix coefficients are utilized in an N by N matrix to convert the color base. Note that the N by N matrix, which may be a 3×3 matrix, 4×3 matrix, a 4×4 matrix, or any other matrix described in existing Standard or future Standard.

FIG 14 illustrates a logic diagram of an alternate method for converting color base of an image. The Process begins at step 210 where an output color base flag is received. The process then proceeds to step 212 where a determination is made as to whether the input image layer color base matches the output color base an indicated by the output color base flag. If so, the process proceeds to step 214 where a color base conversion module passes the image layer without a color base conversion.

If, however, the color base of the image layer does not match the output color base, the process proceeds to step 216. At step 216, the color base of the image layer is converted to match the output color base. This may be further described with reference to steps 218 and 220. At step 218 matrix coefficients are obtained based on the first and second color bases. For example, if the first color base corresponds to RGB data and the second color base corresponds to regular TV data, the 601 Standard defines the coefficients. The process then proceeds to step 220 where the coefficients are utilized in an N by N matrix to convert the color base.

FIG. 15 illustrates a logic diagram of a method for blending a plurality of image input layers. The process begins at step 230 where each of a plurality of image input layers that have a color base that differs from a color base of a display is converted into an image layer having the color base of the display. Note that the plurality of color bases comprise various standardized luma and chroma requirements included in the DTV specifications, the NTSC specification, the PAL specification, the SECAM specification, and RGB data. Further note that the plurality of image layers comprises at least one of graphics data, a graphics hardware cursor, NTSC video data, PAL video data, HDTV video data, SECAM video data which is provided in a portion of a display (e.g., a window).

The process then proceeds to step 232 where each of the converted image layers is blended with each of the plurality of image input layers that have the color base of the display. As an example, assume that the color base of the display corresponds to YCrCb of PAL, NTSC, or SECAM and the image input layers have a color base corresponding to RGB or HDTV. As such, the image input layers are converted to image layers having a color base of YCrCb. The converted image layers are then blended with the input signals already having a color base of YCrCb. The process than may proceed to steps 234 and 236 wherein the blended outputs are converted into another output having a different color base. This was illustrated with reference to FIG. 4A through 4C.

The method of FIG. 15 may further include optional steps 238 and 240. At step 238, each of a plurality of image input layers that have a color base that differs from the color base of a second display are converted into image layers having the color base of the second display. The process then proceeds to step 240 where each of the converted image layers are blended with each of the plurality of image layers that have the color base of the second display. As such, steps 238 and 240 are similar to steps 230 and 232 wherein the video equipment incorporating the image layer blending module has two display color base criteria.

Figure 16:
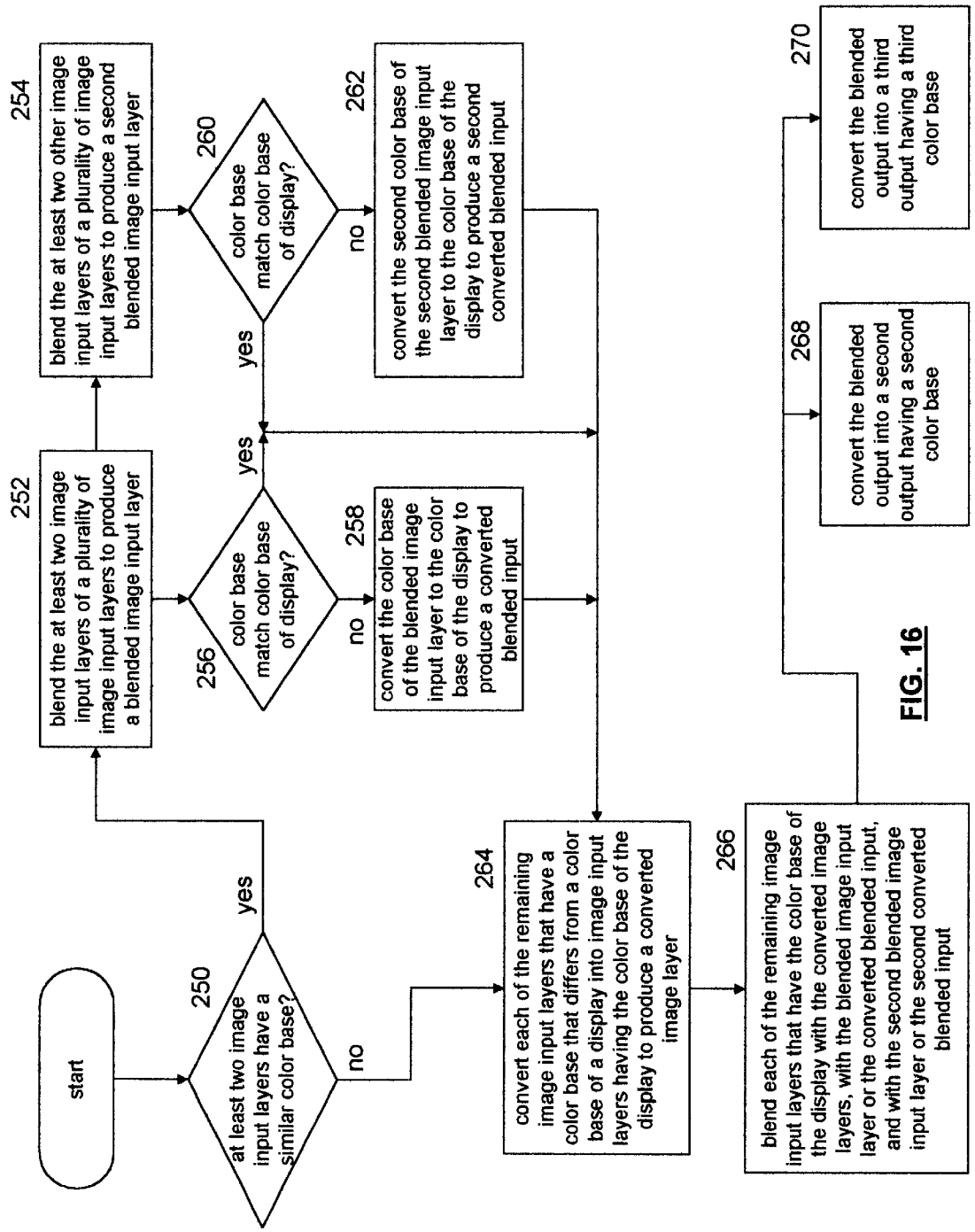
FIG. 16 illustrates a logic diagram of an alternate method for image input layer blending in accordance with the present invention.

FIG. 16 illustrates a logic diagram of an alternate method for blending a plurality of image input layers. The process begins at step 250 where a determination is made as to whether at least two image input layers have a similar color base. If so, the process proceeds to step 252 where the at least two image input layers are blended to produce a blended image input layer. The process then proceeds to 256 and also to an optional step 254. At step 256 a determination is made as to whether the color base of the blended input image layer matches the color base of the display. If yes, the process proceeds to step 264, which will be discussed subsequently. If not, the process proceeds to step 258 where the color base of the blended image input layer is converted to the color base of the display to produce a converted blended input.

If a process includes step 254, the process blends at least another two image input layers that have a different color base than the ones blended at steps 252 to produce a second blended image input layer. The process proceeds to 260 where a determination is made as to whether the color base of the second blended image input layer matches the color base of the display. If so, the process proceeds to step 264. If not, the process proceeds to step 262 where the second color base of the second blended image input layers are converted to the color base of the display to produce a second converted blended input.

At step 264, each of the remaining input layers that have a color base that differs from a color base of the display are converted into image input layers having the color base of the display to produce a converted image input layer. The process then proceeds to step 266 where each of the remaining input layers that have the color base of the display are blended with the converted image input layers, with the blended input layers the converted blended input, and/or with the second blended input layer or the second converted input. Such conversion and blending was illustrated in various embodiments as shown in FIGS. 2 through 9.

The process then proceeds to optional steps 268 and 270. At step 268, the blended output is converted into a second output having a second color base. At step 270 the blended output is converted into a third output having a third color base.

Figure 17:
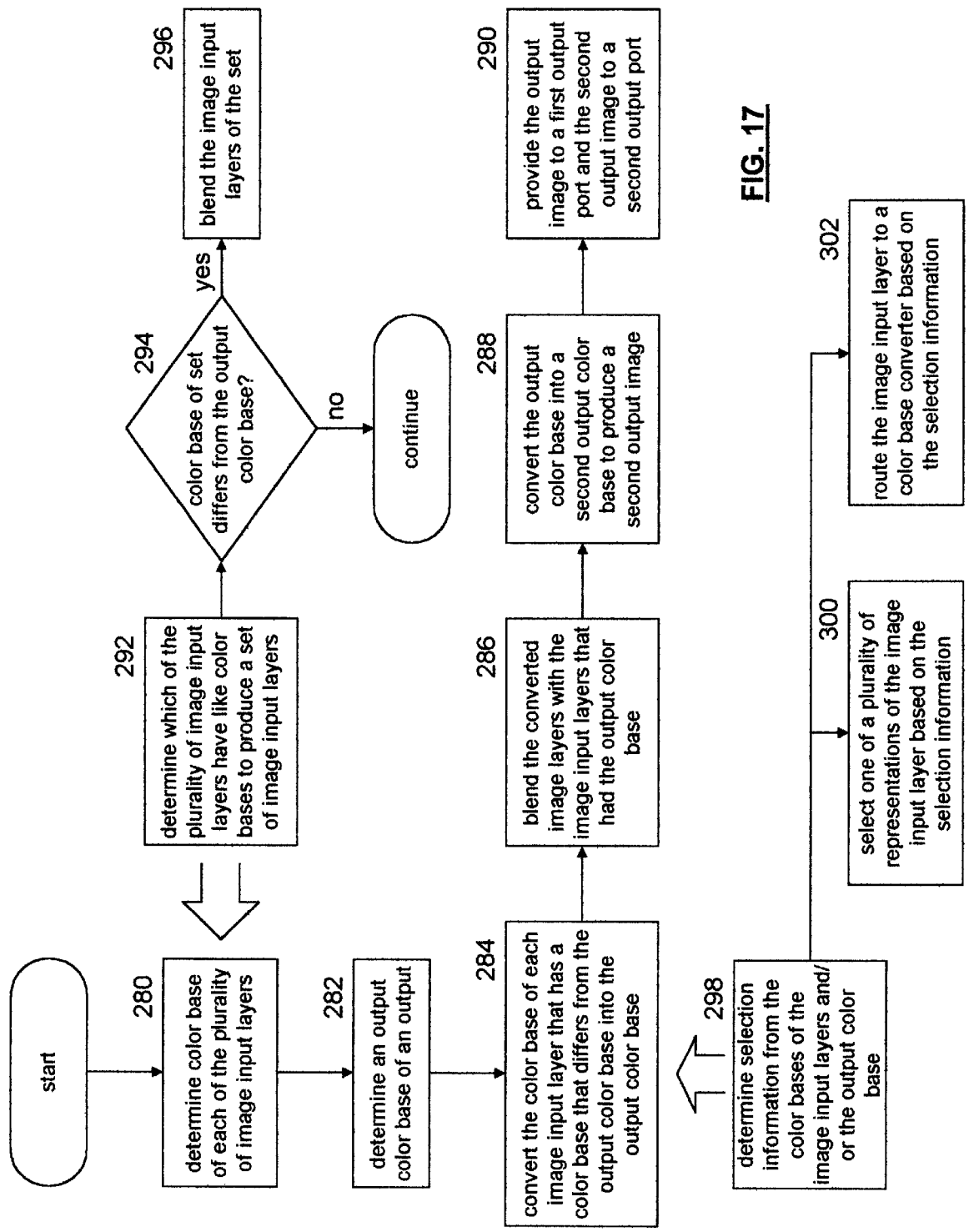
FIG. 17 illustrates a logic diagram of a method for dynamic image layer blending in accordance with the present invention.

FIG. 17 illustrates a logic diagram of a method for dynamically blending a plurality of image input layers. The process begins at step 280 where the color base of each of the plurality of image input layers is determined. Such a determination may be made as shown with respect to steps 292 through 296. At step 292 a determination is made as to which of the plurality of image input layers have like color bases to produce a set of image input layers. The process then proceeds to step 294 where a determination is made as to whether the color base of the set differs from the color base of the output of the video graphics circuit, or the input to the display. If not, the main flow of the process continues. If, however, the color base of the set differs from the color base of the output, or the display, the process proceeds to step 296 where the image input layers of the set are blended.

Returning to the main processing flow, the process proceeds to step 282. At step 282 an output color base of an output is determined. The process then proceeds to step 284 where the color base of each of the image input layers that has a color base that differs from the color base of the output is converted into the output color base. Note that a programmable color base converter may be configured to perform the corresponding conversion. This was previously discussed with reference to FIGS. 6, 9 and 12–14.

The conversion performed at step 284 is further illustrated with respect to steps 298 through 302. At step 298, selection information from the color base of the input image layers and/or the output color base is determined. The selection information corresponds to the input types and/or the signal output types. At step 300, one of a plurality of representations of the image input layer is selected based on the selection information. As such, each image input layer having a particular color base has each of the corresponding other types of color bases generated for it thereby producing a plurality of representations of the image input layer. From this plurality, one is selected based on the selection information. Alternatively, the process may proceed to step 302 where the image input layer is routed to a color base converter that converts the color base based on the selection information.

Returning to the main flow of the process, the process proceeds to step 286 where the converted image layers are blended with the image input layers that have the output color base. The process then proceeds to step 288 where the output color base is converted to a second output color base to produce a second output image. The process then proceeds to step 290 where the output image is provided to a first output port and the second output image is provided to a second output board. The output ports correspond to particular types of signaling connections, for example, an S-video output, composite video output, RGB output, etc.

The preceding discussion has presented a method and apparatus for blending image input layers that have different color bases in accordance with various types of standardized luma and values. By allowing various types of color base conversion, video equipment may readily convert video signals from one standardized color encoding to another. As such, as the world transitions from standard television signals to digital television signals, older equipment may receive digital television signals and present them according to standard TV formatting and newer digital television video equipment may receive and properly display older television signals.

What is claimed is:

1. A method for blending a plurality of image input layers, the method comprises the steps of:
   a) converting each of the plurality of image input layers, of received video signals, that have a color base that differs from a color base of a display into an image layer having the color base of the display to produce a converted image layer, wherein the color base of the display is one of a plurality of color bases; and
   b) blending each of the converted image layers with each of the plurality of image input layers that have the color base of the display to produce a blended output having the color base of the display.

2. The method of claim 1, where the plurality of color bases comprises RGB component systems and luma and chroma YUV component systems.

3. The method of claim 1, wherein each of the plurality of image input layers comprises one of first graphics data, second graphics data, hardware cursor, NTSC video data, ATSC video data, PAL video data, or SECAM video data.

4. The method of claim 1, wherein the color base of the display is YCrCb of PAL, NTSC, or SECAM, and wherein the step (a) further comprises:
   converting each of the plurality of image input layers that have a color base of RGB or ATSC to the converted image layer having a color base of the YCrCb.

5. The method of claim 1 further comprises:
   converting the blended output into a second output having a second color base.

6. The method of claim 5 further comprises:
   converting the blended output into a third output having a third color base.

7. The method of claim 1 further comprises:
   converting each of the plurality of image input layers that have a color base that differs from a second color base of a second display into an image layer having the second color base of the second display to produce a second converted image layer, wherein the second color base of the second display is another one of the plurality of color bases; and
   blending each of the second converted image layers with each of the plurality of image input layers that have the second color base of the second display to produce a second blended output having the color base of the second display.

8. A method for blending a plurality of image input layers, the method comprises the steps of:
   a) blending at least two image input layers of the plurality of image input layers, of received video signals, when the at least two image input layers have a similar color base to produce a blended image input layer and remaining image input layers of the plurality of image input layers;

b) converting each of the remaining image input layers that have a color base that differs from a color base of a display into an image input layer having the color base of the display to produce a converted image layer;

c) converting the blended image input layer into a blended layer having the color base of the display when the color base of the at least two image input layers differs from the color base of the display to produce a converted blended input; and d) blending each of the remaining image input layers that have the color base of the display with each of the converted image layers and with the converted blended input or the blending image input layer when the color base of the blended image input layer matches the color base of the display to produce a blended output.

9. The method of claim 8, wherein step (a) further comprises:

blending at least two other image input layers of the plurality of image input layers when the at least two other image input layers have a similar second color base to produce a second blended image input layer.

10. The method of claim 8 further comprises:

converting the blended output into a second output having a second color base.

11. The method of claim 10 further comprises:

converting the blended output into a third output having a third color base.

12. The method of claim 8 further comprises:

converting each of the remaining image input layers that have a color base that differs from a second color base of a second display into a second image input layer having the color base of the second display to produce a second converted image layer, converting the blended image input layer into a second blended layer having the color base of the second display when the color base of the at least two image input layers differs from the color base of the second display to produce a second converted blended input; and blending each of the remaining image input layers that have the color base of the second display with each of the second converted image layers and with the second converted blended input or the blended image input layer when the color base of the blended image input layer matches the color base of second the display to produce a second blended output.

13. An image input layer blending module comprises:

processing module; and memory operably coupled to the processing module, the memory includes operational instructions that cause the processing module to (a) convert each of the plurality of image input layers, of received video signals, that have a color base that differs from a color base of a display into an image layer having the color base of the display to produce a converted image layer, wherein the color base of the display is one of a plurality of color bases; and (b) blend each of the converted image layers with each of the plurality of image input layers that have the color base of the display to produce a blended output having the color base of the display.

14. The image input layer blending module of claim 13, wherein the color base of the display is YCrCb of PAL, NTSC, or SECAM, and wherein the memory further comprises operational instructions that cause the processing module to:

convert each of the plurality of image input layers that have a color base of RGB or ATSC to the converted image layer having a color base of the YCrCb.

15. The image input layer blending module of claim 13, wherein the memory further comprises operational instructions that cause the processing module to:

convert the blended output into a second output having a second color base.

16. The image input layer blending module of claim 15, wherein the memory further comprises operational instructions that cause the processing module to:

convert the blended output into a third output having a third color base.

17. The image input layer blending module of claim 13, wherein the memory further comprises operational instructions that cause the processing module to:

convert each of the plurality of image input layers that have a color base that differs from a second color base of a second display into an image layer having the second color base of the second display to produce a second converted image layer, wherein the second color base of the second display is another one of the plurality of color bases; and blend each of the second converted image layers with each of the plurality of image input layers that have the second color base of the second display to produce a second blended output having the color base of the second display.

18. An image input layer blending module comprises:

processing module; and memory operably coupled to the processing module, the memory includes operational instructions that cause the processing module to (a) blend at least two image input layers of the plurality of image input layers, or received video signals, when the at least two image input layers have a similar color base to produce a blended image input layer and remaining image input layers of the plurality of image input layers; (b) convert each of the remaining image input layers that have a color base that differs from a color base of a display into an image input layer having the color base of the display to produce a converted image layer; (c) convert the blended image input layer into a blended layer having the color base of the display when the color base of the at least two image input layers differs from the color base of the display to produce a converted blended input; and (d) blend each of the remaining image input layers that have the color base of the display with each of the converted image layers and with the converted blended input or the blending image input layer when the color base of the blended image input layer matches the color base of the display to produce a blended output.

19. The image input layer blending module of claim 18, wherein the memory further comprises operational instructions that cause the processing module to:

blend at least two other image input layers of the plurality of image input layers when the at least two other image input layers have a similar second color base to produce a second blended image input layer.

20. The image input layer blending module of claim 18, wherein the memory further comprises operational instructions that cause the processing module to:

convert the blended output into a second output having a second color base.

21. The image input layer blending module of claim 20, wherein the memory further comprises operational instructions that cause the processing module to:

convert the blended output into a third output having a third color base.

22. The image input layer blending of module of claim 18, wherein the memory further comprises operational instructions that cause the processing module to:
- convert each of the remaining image input layers that have a color base that differs from a second color base of a second display into a second image input layer having the color base of the second display to produce a second converted image layer;
- convert the blended image input layer into a second blended layer having the color base of the second display when the color base of the at least two image input layers differs from the color base of the second display to produce a second converted blended input; and
- blend each of the remaining image input layers that have the color base of the second display with each of the second converted image layers and with the second converted blended input or the blended image input layer when the color base of the blended image input layer matches the color base of second the display to produce a second blended output.

23. An image input layer blending module comprises:
- a first converting module for converting a first image input layer, of received video signals, having a first color base into a first converted image input layer having a second color base;
- a second converting module for converting a second image input layer, of received video signals, having a third color base into a first converted image input layer having the second color base; and
- a blending module operably coupled to the first and second converting modules, wherein the blending module blends the first and second converted image input layers into an output image having the second color base.

24. The image input layer blending module of claim 23 further comprises a third converting module for converting a third image input layer having a third color base into a third converted image input layer having the second color base, wherein the blending module is further couple to receive the third converted image input layer and to blend the first, second, and third converted image input layers into the output image having the second color base.

25. The image input layer blending module of claim 23, wherein the blending module is further operably coupled to receive a third image input layer having the second color base and to blend the first, second, and third converted image input layers into the output image having the second color base.

26. The image input layer blending module of claim 23 further comprises:
- a third converting module for converting the second image input layer having the second color base into a third converted image input layer having the first color base;
- a second blending module operably coupled to receive the first image input layer having the first input and the third converted input layer, wherein the second blending module blends the first image input layer and the third converted image input layer to produce a second output having the first color base.

27. The image input layer blending module of claim 23 further comprises:
- a third converting module operably coupled to receive the output image having the second color base and to produce a second output image having the first color base.

* * * * *